United States Patent [19]

Noguchi

[11] Patent Number: 4,782,367

[45] Date of Patent: Nov. 1, 1988

[54] EXTRA DATA ADDING UNIT FOR A COPIER

[75] Inventor: Koichi Noguchi, Tokyo, Japan

[73] Assignee: Ricoh Company, Ltd., Tokyo, Japan

[21] Appl. No.: 119,573

[22] Filed: Nov. 12, 1987

[30] Foreign Application Priority Data

Nov. 12, 1986 [JP] Japan .......................... 61-173457[U]

[51] Int. Cl.$^4$ .............................................. G03B 27/52

[52] U.S. Cl. ......................................... 355/40; 355/68; 355/75

[58] Field of Search ...................... 355/7, 40, 14 R, 68, 355/75, 41

[56] References Cited

U.S. PATENT DOCUMENTS

| | | | |
|---|---|---|---|
| 3,983,571 | 9/1976 | Russo | 355/41 X |
| 4,012,122 | 3/1977 | McVeigh | 355/40 X |
| 4,110,794 | 8/1978 | Lester et al. | 355/40 X |
| 4,444,490 | 4/1984 | Stark et al. | 355/40 |
| 4,472,050 | 9/1984 | Stockburger et al. | 355/40 |
| 4,533,237 | 8/1985 | Stockburger et al. | 355/40 |
| 4,707,121 | 11/1987 | Sawaki et al. | 355/40 |
| 4,742,373 | 5/1988 | Nakatani | 355/40 X |

*Primary Examiner*—Richard A. Wintercorn
*Attorney, Agent, or Firm*—Oblon, Fisher, Spivak, McClelland, & Maier

[57] ABSTRACT

An extra data adding unit for an electrophotographic copier and others which allows date, time, page number, managerial number and other extra data, as distinguished from document data, to be copied together with an original document. The unit is provided with a thin flat configuration. A first display section for displaying extra data is provided on one surface of the unit while a second display section for monitoring the extra data and switches for setting modes and data are provided on the other surface of the unit. A battery for powering the unit is removably contained in the unit. That surface of the unit on which the monitor display section and switches are disposed is constituted by a white, light diffusing surface except for its area where the first display section is located. The position of the first display area is indicated on the other surface of the unit. A means for sensing light which illuminates a document is disposed in the vicinity of at least a pair of portions of the first display section which are positioned diagonally to each other. To discriminate the data from the document data, a fixed pattern is provided on that surface of the unit where the data display section is arranged. The fixed pattern bifunctions as the light sensing means or, alternatively, at least a part of the fixed pattern defines a light inlet for the light sensing means.

10 Claims, 10 Drawing Sheets

EXTRA DATA ADDING UNIT FOR A COPIER

BACKGROUND OF THE INVENTION

The present invention relates to a unit usable with a copier for adding extra data to those data which are printed on an original document.

While an electrophotographic apparatus or like copier is operated to copy an original document or documents, it would be very convenient from the standpoint of storage and management of copies if the date and time of copying, page numbers, manegerial numbers and other extra, as distinguished from document data printed on the documents, could be copied together with the document data. A device for adding such extra data is disclosed in, for example, Japanese Laid-Open Utility Model Publication (Kokai) 59-119442/1984 and 58-152634/1983.

In any of the prior art extra data adding devices, a display section for displaying extra data is disposed in a particular area which constitutes a part of a glass platen, or in a sliding mechanism located in the vicinity of a glass platen. This brings about a problem that the position where data can be added is either fixed or limited to a narrow range, preventing a person from adding extra data to a desired position on a copy. Another problem is that in the case that a part of the device is placed overlapping an original document which is relatively thin, the contour of the device itself appears on a copy.

While the data adding device may be implemented with a unit which is physically independent of a copier so as to allow extra data to be added in any desired position, such gives rise to another problem. Specifically, an extra data adding unit independent of a copier is incapable of interchaning signals with the copier so that, when page numbers should be added, a person has to operate a switch for changing the numerical display of the unit every time a document is replaced with another. When it is desired to number copies to facilitate management at a particular division, it is necessary to copy a single document and to provide the copies with a serial number. In such a condition, when a plurality of sets of copies are to be produced, it is impossible to continuously copy an original document by setting a desired number of copies on a copier unless the unit has a function of changing the display as instructed by a signal from the copier. Specifically, documents have to be copied one at a time while changing the display of the unit each time, consuming disproportionate time and labor.

So long as date or time is selected as extra data, no problem arises in practice. However, since the display of date and time is controlled by the clock function of the unit, the display is variable with no regard to the copier. Should the timing when the unit is rewriting the display and the timing when the copier exposes the extra data for copying it chance to coincide with each other, the transitional rewriting condition would be copied in a paper to render the extra data illegible. While such an occurrence is rare when the extra data is date, it does occur with substantial probability when the extra data is time, especially when it includes seconds. In the case that the display for extra data is implemented with an electrochromic display (ECD), it is a prerequisite that data be rewritten by deleting old data first and, then, writing new data due to its inherent characteristic. This, coupled with the slow response particular to ECD, troubles are apt to be derived from the data rewiting timing.

Another problem is that when an arrangement is so made as to allow extra data to be copied in a desired portion of a paper, difficulty is experienced in distinguishing extra data from document data in a reproduction.

SUMMARY OF THE INVENTION

It is, therefore, an object of the present invention to provide a new and useful extra data adding unit capable of adding extra data in any desired position of a paper, eliminating the previously discussed problem particular to a relatively thin document as well as the problem derived from the data rewriting timing and troublesome operations for changing a number being displayed and others, and promoting easy and sure discrimination between extra data and document data.

A thin flat unit usable with a copier for copying desired extra data together with data which are printed on an original document of the present invention comprises a base plate having a thin flat configuration, a first display section provided on one surface of the base plate for displaying the extra data, a second display section provided on the other surface of the base plate for monitoring the extra data, switches arranged on the other surface of the base plate for setting modes and data, and a control section responsive to outputs of the switches for controlling the first and second display sections.

The above and other objects, features and advantages of the present invention will become more apparent from the following detailed description taken with the accompanying drawings.

DESCRIPTION OF THE PREFERRED EMBODIMENTS

Various embodiments of the data adding unit in accordance with the present invention will hereinafter be described with reference to the accompanying drawings.

FIRST EMBODIMENT

An extra data adding unit in accordance with a first embodiment is generally comprised of a first display section for displaying extra data to be added, a second display section for monitoring the condition of extra data being displayed, switches for setting up modes and data, and a control section for controlling the display sections in response to outputs of the switches. In this embodiment, the unit has a thin flat configuration which may even be implemented with a card and, therefore, flexible. While the first display section, or data display section, is provided on one surface of the unit, the second display section, or monitor display section, and the switches are arranged on the other surface. A battery for powering the unit is removably mounted in the unit. The surface of the unit on which the data display section is provided is constituted by a white, light diffusing surface except for the data display section. The position of the data display section is indicated on the other surface of the unit so that a person may see it from the opposite side to the data display section, such display relying on drawing or coloring or utilizing the monitor display section by way of example. The unit in this embodiment is physically independent of a copier body as the term "unit" indicates.

Figure 1A:
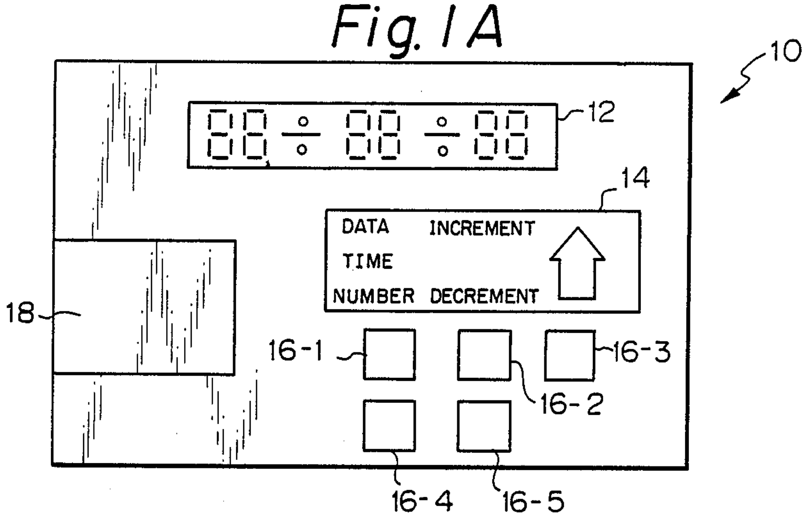
FIGS. 1A to 1C are views showing a first embodiment of the extra data adding unit in accordance with the present invention.
Figure 1B:
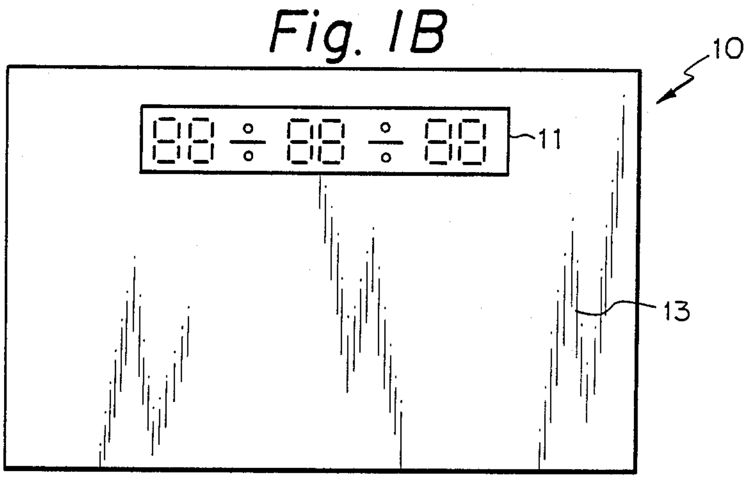
Figure 1C:
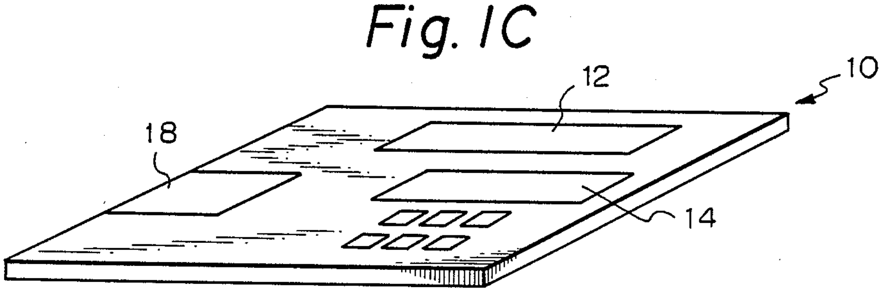

Referring to FIGS. 1A to 1C, a specific construction of the extra data adding unit in accordance with the first embodiment is shown and generally designated by the reference numeral 10. FIG. 1A shows that surface of the unit 10 on which the monitor display section is positioned, this surface being referred to as the "front" hereinafter for the sake of convenience. FIG. 1B shows the other surface, or "back", of the unit 10 on which the data display section is provided.

As shown in FIG. 1C, the data adding unit 10 is provided with a thin flat configuration. As shown in FIG. 1A, displays 12 and 14, switches 16-1 to 16-5 and a cover 18 are disposed on the front of the unit 10. Implemented with liquid crystal, the displays 12 and 14 constitute the monitor display section. The cover 18 is openable to mount and dismount a battery from a battery containing portion of the unit 10. Arranged in the display 12 are three pairs of numerical display segments each being spaced from the nearby pairs, and a horizontal bar and a colon located between each nearby segment pairs. Each set of segments for representing a numeral is made up of seven segments which are arranged in an "8" shape. The horizontal bars are used to represent date, the colons are used to represent time, and only the numerals are displayed to represent a number with the horizontal bars and colons not used. Why such different display modes are adopted is as follows. While in an ordinary watch distinction between the display of date and that of time is needless since a person who uses the watch is expected to select data or time and see the display, in an extra data adding device for a copier copies have to be identified after a substantial period of time or by a person other than one who selected data or time. The display 14 is adapted to show guidances for the selection of modes.

The switch 16-1 is a mode selection switch. Specifically, every time the switch 16-1 is depressed, it selects one of a date mode, a time mode and a number mode in this sequence, the mode selected being displayed on the display 14. The switch 16-2 is operable to increment or decrement the numerical value as desired when the switch 16-5 is depressed to change the numeral for changing date or setting time or number, the increment or the decrement selected appearing on the display 14. This particular function is adopted because, in a copier of the type copying original documents last page first to cause the resulting copies to be stacked in order of page in a discharge section, the copies have to be paginated by sequentially reducing the page number. The switch 16-3 is adapted to invert the orientation of extra data being displayed, the orientation being represented by an arrow on the display 14. Such will be described in detail later.

The switch 16-4 is operable to set up a mode for changing data being displayed. Specifically, when the switch 16-4 is depressed, the numerals appearing on the display 12 are caused to blink on the basis of two figures which are isolated from the nearby ones by the colons or the bars. Every time the switch 16-4 is depressed, the blinking figures are shifted leftward to the next two figures; as the blinking figures are out, this mode is ended. While any of the figures is blinking, the numerals on those figures can be changed by the switch 16-5. The switch 16-5 increments the numerical value by one every time it is depressed and increments it continuously one by one through the control section when continuously depressed for more than about three seconds. The upper limit of the numerical values on each figure differs from one mode to another. Specifically, the upper limit of minutes is "59", that of seconds is also "59", that of hours is "23", that of months is "12", and that of days is "31". When any of the upper limits is exceeded, the display returns to "0" or "1" and, then, sequentially increases by one at a time. After necessary data has been entered on any of the figures, that data is set when the switch 16-4 is depressed to shift the figure.

Referring to FIG. 1B, a display 11 which constitutes the previously mentioned data display section is provided on the back of the extra data adding unit 10. In this particular embodiment, the display, or data display, 11 is implemented with an electrochromic display (ECD). That part 13 of the back of the unit 10 where the display 11 is absent is constituted by a white, light diffusing surface which may advantageously be implemented with a white plastics sheet or white painting. If desired, a transparent sheet may be laminated on the white painting so as to suppress contamination. ECD reversively changes its color by electrochemical oxidation and reduction; in this embodiment, it becomes blue when colored and white when discolored. The background of the display 11 is implemented with a white alumina plate so that when the ECD is discolored, the display 11 becomes white over its entire area. In this manner, since the display 11 is as white as the paper which constitutes the background of an ordinary document, the display 11 except for the colored portions simply appears blank on a copy when copied together with a document. Data being displayed on the front display 12 is displayed on the back display 11 also. Hence, one can monitor data appearing on the display 11 by looking at the display 12.

The orientation of data appearing on the data display 11 is invertible in the up-down direction. It should be understood that the words "inverting the up-down orientation of data" implies reorienting data being displayed as if the entire display 11 is rotated 180 degrees in its own plane, and not inverting it figure by figure. Hence, even when the display is turned upside down, the date, time or numeral is represented in the same manner as in the usual representation. For example, while time is displayed by hours, minutes and seconds which are arranged in this order, such an order is unchanged even when the display is turned over. This inverting function is usable for achieving more clear addition of extra data.

Figure 2A:
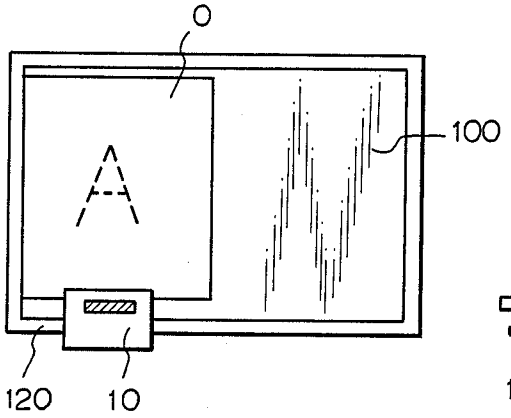
FIGS. 2A to 2D are views showing different positions in which an extra data adding unit may be used.
Figure 2B:
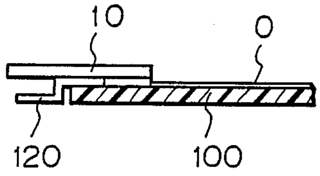
Figure 2C:
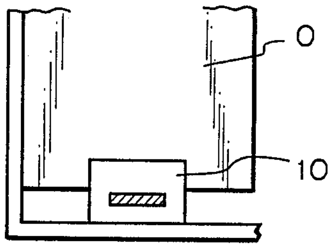
Figure 2D:
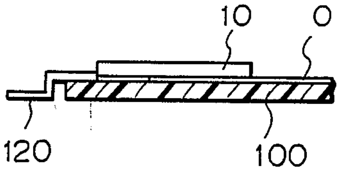

For example, as shown in FIG. 2A, assume that a person desires to add extra data to the bottom of an original document O which is laid on a glass platen 100 by using the extra data adding unit 10. Here, the character "A" represented by a broken line in FIG. 2A is indicative of the up-down direction of the document, i.e., the upper portion of FIG. 2A corresponds to that of the document O. When the person intends to align extra data with the document O with respect to the up-down orientation, he or she may place the unit 10 on a document guide scale 120, as shown in FIGS. 2A and 2B. This, however, brings about a problem that the data display 11 is spaced from the glass platen 100 due to the thickness of the scale 120, causing black shadow to appear around extra data on a copy. On the other hand, as shown in FIGS. 2C and 2D, when the unit 10 is positioned in the opposite orientation to the document O with respect to the up-down direction, the lift of the data display 11 above the glass platen 100 is not more than the thickness of the document O and, hence, the appearance of black shadow is effectively suppressed. However, simply positioning the unit 10 on the glass platen 100 as shown in FIGS. 2C and 2D would make the up-down orientation of the extra data opposite to that of the document O and, therefore, make the extra data difficult to see. In this condition, the function of turning over the data on the display 11 as previously stated is usable for inverting the up-down orientation of data appearing on the display 11 relative to that of the unit 10 beforehead. Then, by positioning the unit 10 as shown in FIGS. 2C and 2D, it is possible to match the document O and the extra data with respect to the up-down orientation while effectively suppressing the occurrence of black shadow.

As stated earlier, the reorientation of data being displayed on the data display 11 is effected by the switch 16-3. Specifically, every time the switch 16-3 is depressed, the orientation of data on the display 11 is inverted while, at the same time, a particular orientation selected is represented by the arrow on the display 14.

As shown in FIGS. 1A and 1B, the display 12 on the front and the display 11 on the back are in register with each other, i.e., projecting the display 12 toward the back precisely causes it into alignment with the display 11. Specifically, in this particular embodiment, the position of the display 11 is indicated by using the display 12.

Figure 3:
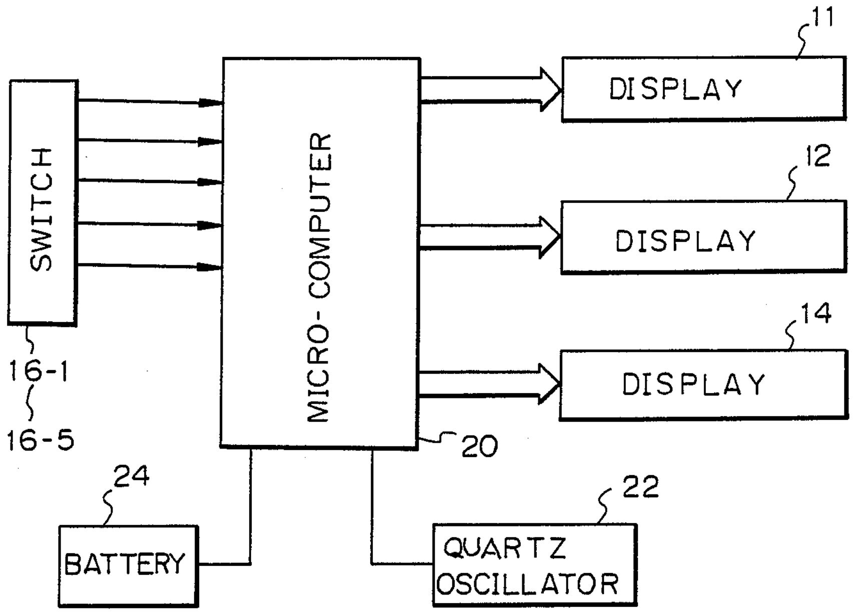
FIG. 3 is a schematic block diagram showing a control system installed in the unit of FIGS. 1A to 1C.
Figure 4:
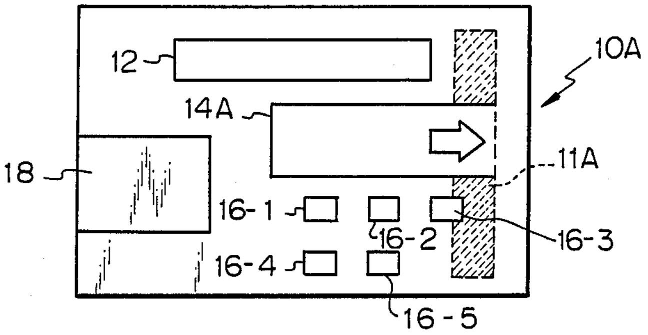
FIGS. 4 to 7 are views showing different modifications to the first embodiment of FIGS. 1A to 1C.
Figure 5:
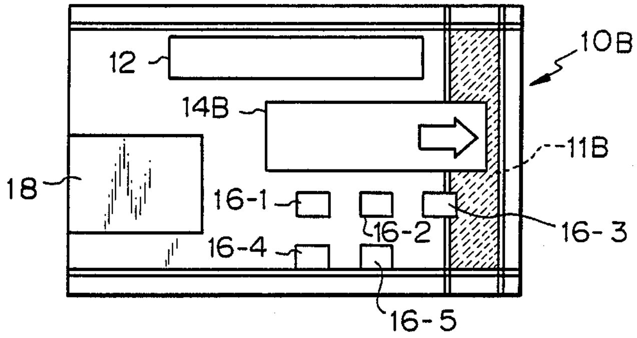

Referring to FIG. 3, an electrical arrangement of this embodiment is shown in a block diagram. In the figure, a microcomputer 20 and a quartz oscillator 22 constitute the control section and are powered by a battery 24, which is contained in the extra data adding unit 10. The microcomputer 20 serves as a clock based on the oscillation frequency of the quartz oscillator 22, thereby constantly maintaining date and time data. At the same time, the microcomputer 20 controls the displays 11, 12 and 14 in response to output signals of the switches 16-1 to 16-5.

Referring to FIGS. 4 to 7, modifications to the embodiment shown and described are shown. In the figures, those structural elements which are considered free from the fear of confusion are designated by like reference numerals.

Figure 6:
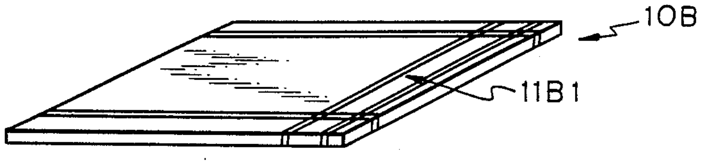

Generally, extra data adding units shown in FIGS. 4 to 7 are distinguishable from that of FIGS. 1A to 1C in that the data display on the back is not aligned with the monitor display on the front. Specifically, in the unit 10A shown in FIG. 4, the position of the data display 11A is indicated on the front by coloring that area of the front where the display 11A is projected (represented by hatching in the figure) in a color different from that of the other area. In the unit 10B of FIGS. 5 and 6, those lines provided on the front for showing the position of the display 11B (indicated by hatching in the figure) are individually extended to the edges of the front and, as shown in FIG. 6, further to the end faces. As shown in FIG. 6, the position of the display 11B is represented on the front by the area 11B1 which is defined by the above-mentioned lines. It is to be noted that extending those lines to the end faces is advantageous over stopping them at the edges because such would eliminate positioning errors due to angular parallax which is ascribable to the thickness of the unit 10B.

Figure 7:
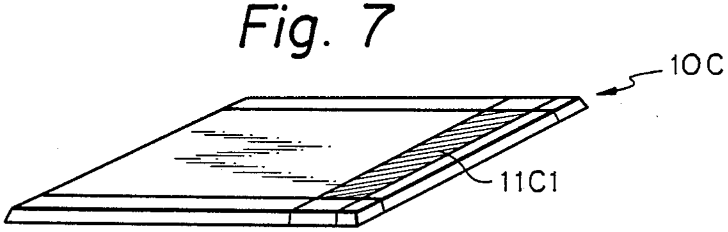

In FIG. 7, the extra data adding unit 10C is provided with a trapezoidal cross-section whose longest side is defined by the back of the unit 10C. On the front, the position of the display is indicated by a colored area 11C1. The trapezoidal cross-section serves to allow a minimum of gap to be defined between the unit 10C and a document guide scale when the former is abutted against the latter, thereby eliminating black stripes otherwise appearing on a copy.

In these modifications, the orientations of displays on the front and back are different from each other. The arrow provided on any of the displays 14A and 14B selectively indicates the right and the left based on the orientation of data being displayed on the display 11A or 11B. The inversion of the up-down orientation of data is applied to the display on the back only. While the embodiment of FIGS. 1A to 1C has been shown and described as inverting the orientation on both the front and the rear, it may be constructed to invert the orientation on the back only. In the modifications shown in FIGS. 4 to 7, the reference numerals individually correspond to those of FIGS. 1A to 1C. The modifications are each controlled by the same control section as that of the embodiment of FIGS. 1A to 1C.

Hereinafter will be described a procedure for adding extra data which may be implemented with any of the embodiment and modifications thereto stated above.

When it is desired to add date or time as extra data, all that is required is selecting the data mode or the time mode by the switch 16-1. An original document is shifted, cut or folded to accommodate the extra data in a desired area thereof, and the display 11 on the back of the unit is positioned in that area. Then, the document and the unit are ready to be copied together.

To paginate copies by using the number displaying function, the mode selection switch 16-1 is depressed to establish the number mode. Then, so long as old data are not held, "00" appears on the rightmost pair of figures on the display 14 with the other pairs left blank. In this condition, the data set switch 16-4 is depressed to cause the rightmost figures to blink and, then, lowermost two bits of a numerical value which is representative of the first page to be copied are set. Thereafter, when the switch 16-4 is depressed, those figures stop blinking and, instead, two upper figures next to them start blinking while displaying "00". If the upper two figures are needless, the switch 16-4 is depressed again to cause the two uppermost figures to blink while displaying "00". If the uppermost two figures are needless, the switch 16-4 is depressed again resulting that the blinking is stopped and "0" at each of the upper figures disappears. The unit conditioned so is loaded on the glass platen to be copied together with an original document. Every time the document is replaced with another, the switch 16-5 is depressed to increment the number by one. In this particular mode, whether to increment or to decrement the data on the lowermost figures is determined by the switch 16-2, whereby the need for operating the switch 16-4 each time is eliminated. The switch 16-4 is usable for rapidly changing the data on the upper figures.

SECOND EMBODIMENT

An extra data adding unit in accordance with a second embodiment is generally comprised of a data display section, a monitor display section, a light sensing means, switches, and a control section. Adapted to display extra data as in the first embodiment, the data display section is provided with a rectangular configuration which includes a square. The monitor display section functions in the same manner as that of the first embodiment. The light sensing means is responsive to light which is adapted to illuminate an original document. The switches are operable to establish modes and data as desired. The control section controls the two display sections in response to output signals of the light sensing means and switches. Again, the unit has a thin flat configuration which may even be implemented with a card and, therefore, flexible. The data display section is provided on one surface of the unit while the monitor display section and switches are provided on the other surface. That surface on which the data display section is disposed is constituted by a white, light diffusing surface except for that display section. The light sensing means is located in the vicinity of at least a pair of portions of the data display section which are positioned diagonally to each other, in order to sense the light by way of the white, light diffusing surface. The unit of this embodiment is physically independent of a copier and powered by a built-in battery and, hence, it may be located in any desired position on a glass platen, as in the first embodiment. That surface on which the data display section is provided is constituted by a white, light diffusing surface as stated above, so that it merges into the background when superposed on a thin original document. Since the light sensing means senses light which is adapted to illuminate a document, how many times a copying cycle has been effected in a continuous copy mode can be known. Due to the particular position of the light sensing means, it is possible to determine whether or not the data display section is being illuminated by the light.

A specific construction of the extra data adding unit in accordance with the second embodiment will be described in detail with reference to the accompanying drawings. In the second embodiment, the same or similar structural elements as those of the first embodiment and its modifications are designated by like reference numerals, and detailed description thereof will be omitted to avoid redundancy.

Figure 8A:
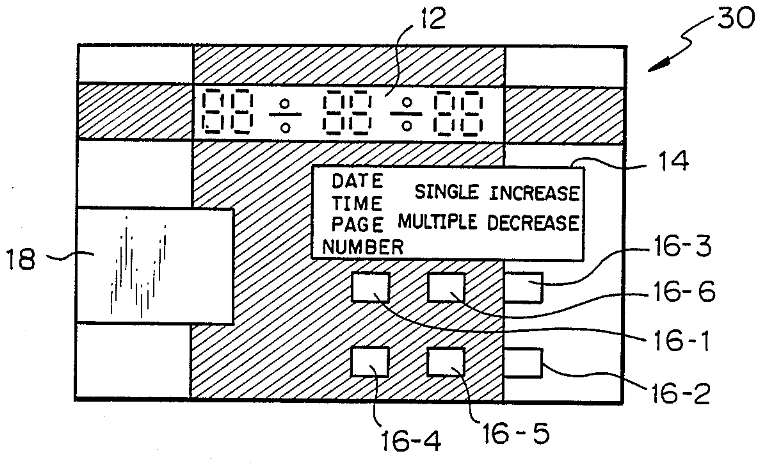
FIGS. 8A to 8C are views showing a second embodiment of the present invention.
Figure 8B:
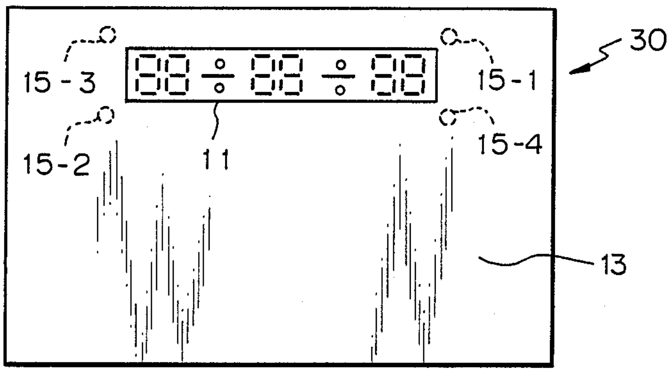
Figure 8C:
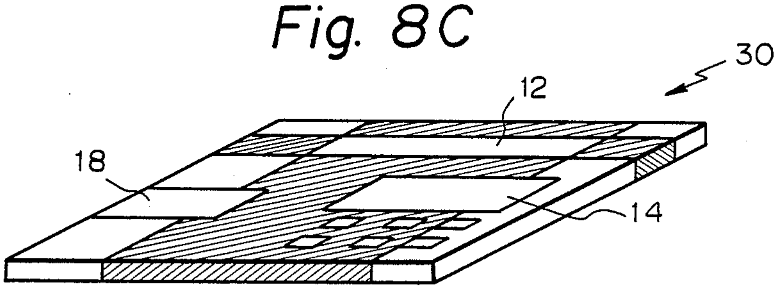

Referring to FIGS. 8A to 8C, an extra data adding unit 30 is provided with the displays 12 and 14 each being implemented with liquid crystal, switches 16-1 to 16-5, and cover 18. In this particular embodiment, another switch 16-6 is provided which is operable to set the number of copies which should be produced with the same original document, i.e., single copy or multiple copies, the result of selection appearing on the display 14. As regards the switch 16-1, it conditions the display 12 for a date mode, a time mode, a page mode, and a number mode in this order every time it is depressed, the mode selected also appearing on the display 14.

The parallel lines which define the contour of the display 12 are extended to the edges of the unit 30 and, as shown in FIG. 8C, further to the end faces of the unit 30. The areas defined by those extensions of the parallel lines (indicated by hatching in the figures) are distinguished from the other areas by coloring, so that the display 11 may be positioned with ease at the front side.

As shown in FIG. 8B, light-sensitive elements 15-1 to 15-4 which serve as the light sensing means are positioned on the back of the white, light diffusing surface 13 and may be implemented with photodiodes by way of example. The light-sensitive elements 15-1 to 15-4 are sensitive to diffused light which is transmitted through the white, light diffusing surface. The light-sensitive elements 15-1 and 15-2 are paired, and so are done the light-sensitive elements 15-3 and 15-4. The paired elements 15-1 and 15-2 are individually positioned close to a pair of diagonal portions of the display 11, and the paired elements 15-3 and 15-4 are positioned close to the other pair of diagonal portions of the same. It is to be noted that the two pairs of light-sensitive elements may be replaced with a single pair of light-sensitive elements in which case, too, the two elements should be individually positioned close to a pair of diagonal portions of the display 11.

When the unit 30 is placed on the glass platen of a copier to add extra data to document data, the light-sensitive elements 15-1 to 15-4 each senses light issuing from a lamp of the copier to produce a signal which is adapted to control the addition of extra data. Since the intensity of light issuing from the lamp as measured on the glass platen is far greater than those of natural light and ordinary room lighting, the light issuing from the lamp can be sensed in distinction from the others by adequately selecting the sensing level. Further, the light-sensitive elements 15-1 to 15-4 are arranged on the back of the white, light diffusing surface as previously stated and, therefore, they do not show themselves on a copy. Hence, by sensing the operations of a copier by the light-sensitive elements 15-1 to 15-4 and controlling the display of the data adding unit 30, advanced functions are attainable while preserving the advantage that the unit 20 independent of a copier can be placed in any desired position on a glass platen. In addition, since the back of the unit 30 appears as white as the background of an original document over its entire area while the display 11 is blank, it does not appear on a copy even when copied together with a document. This allows extra data to be added even to data of a relatively thin and transparent document while preventing the unit 30 from being copied.

Figure 9:
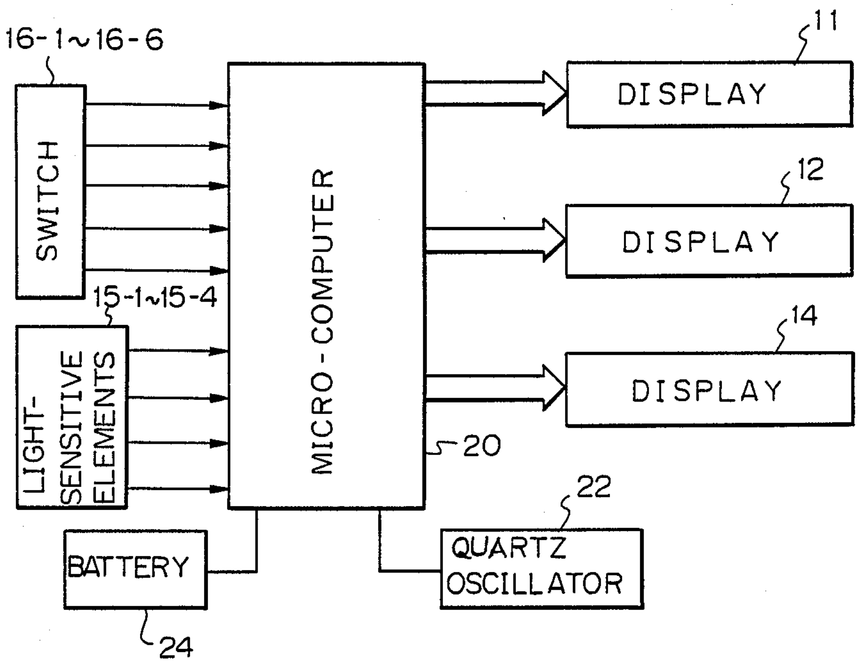
FIG. 9 is a schematic block diagram showing a control system which is installed in the unit of FIGS. 8A to 8C.
Figure 10:
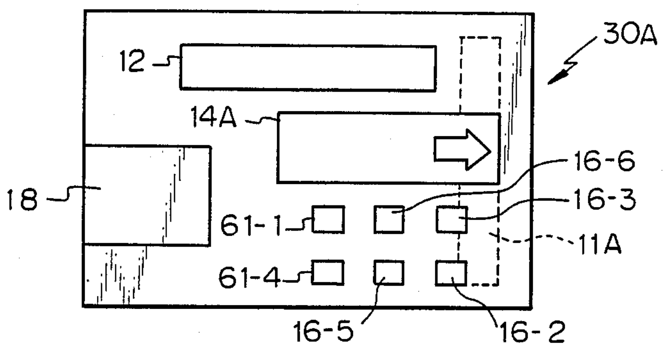
FIGS. 10 to 13 are views showing modifications to the second embodiment of FIGS. 8A to 8C.
Figure 11:
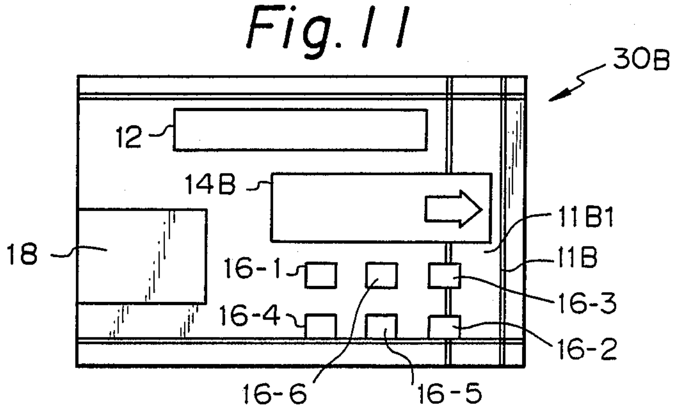
Figure 12:
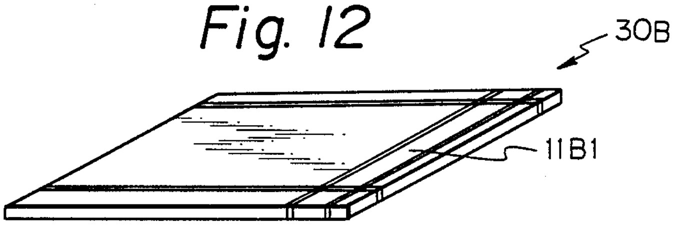
Figure 13:
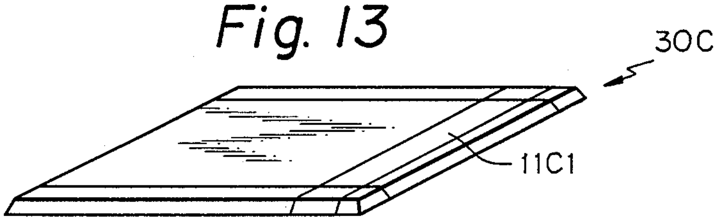

FIG. 9 shows in a block diagram an electrical arrangement which is built in the extra data adding unit 30. This block diagram differs from that of FIG. 2 in that it feeds the output of the switch 16-6 and those of the light-sensitive elements 15-1 to 15-4 to the microcomputer 20.

The function of the light-sensitive elements 15-1 to 15-4 is as follows. A lamp installed in a copier for illuminating a document is elongate and scans a document from one end toward the other end of a glass platen. Hence, with no regard to the position of the extra data adding unit 30 on the glass platen, at least one of the light-sensitive elements 15-1 to 15-4 is illuminated before the display 11, and at least one of the other light-sensitive elements 15-1 to 15-4 is continously illuminated until the display 11 becomes fully illuminated. For example, assuming that the element 15-3 is illuminated before the others, the illumination terminates at the light-sensitive element 15-4. Specifically, when any of the light-sensitive elements 15-1 to 15-4 is illuminated first, another light-sensitive element which is positioned diagonally to that element with respect to the display 11 is continuously illuminated to the end.

The above-stated relationship is used to sense the condition of extra data being displayed. The interval between a positive going edge of the output of a particular one of the light-sensitive elements 15-1 to 15-4 which has sensed light first and a negative going edge of the output of another light-sensitive element which is positioned diagonally to that element is assumed to be represented by an under-exposure signal A. The content of control differs from one mode to another.

In the date mode or the time mode, while extra data is copied, i.e., while the under-exposure signal appears, the change of display is suspended even if the numerals to be displayed are changed; the data is updated after the signal A has disappeared.

In the page mode, different control is performed for each of the single copy mode and the multiple copy mode on the basis of the value initially set and the page increase/decrease command. In the single copy mode, the under-exposure signal A is sensed and, every time it falls, extra data is updated. In the multiple copy mode, extra data is not changed until the under-exposure signal A becomes detected twice, and the repetition period of the signal A is measured. When the repetition period of the signal A expires before the third appearance of the signal A, the extra data is changed. This is to detect the replacement of an original document by using the fact that the interval between the replacement of a document and the start of the next copying cycle is usually longer than the interval between consecutive copying cycles as performed in the multiple copy mode.

The number mode is applicable to the multiple copy mode only, i.e., the single copy mode is the same as that of the page mode. In the number mode, extra data is changed at each positive going edge of the under-exposure signal A, and the period of the signal A is measured. When the period of the signal A expires before the signal A is detected, the extra data being displayed is returned to the initial set value.

In any of such modes, when the inputs to the light-sensitive elements are absent over a predetermined period of time, the display is automatically returned to the time mode. An arrangement is so made as to clear page, number and other data when the time mode is selected. In this embodiment, the four light-sensitive elements 15-1 to 15-4 are used so that even when the unit 30 is placed obliquely to an intended scanning direction of a copier, the unit 30 may operate with accuracy. If it is needless to place it obliquely, only two light-sensitive elements which are located diagonally to each other will suffice.

FIGS. 10 to 13 show modifications to the second embodiment described above. The modifications of FIGS. 10 to 13 correspond, respectively, to those of FIGS. 4 to 7 and will not be described in detail to avoid redundancy.

Hereinafter will be described a procedure for adding extra data by using any of the extra data adding units in accordance with the second embodiment and modifications thereto, specifically only that part of the procedure which differs from that of the first embodiment.

As regards the switch 16-6, it is operated to determine whether to produce a single copy or to produce multiple copies with the same original document. Under this condition, the extra data adding unit 30 is placed on a glass platen of a copier, followed by a copying operation. Every time the document is replaced with another, the page number being displayed is automatically change by one. In this mode, whether to increase or to decrease the data on the lowermost figures one at a time is decided through the switch 16-2. On the other hand, when the switch 16-1 is depressed, the number mode, the multiple copy mode and the number increment mode are automatically selected. In such a case, while the initial number is "1", any other desired initial number may be set as in the page mode. When the unit 30 is laid on the glass platen to be copied together with an original document, a different number is printed out on each copy; when the document is replaced with another, the number is restored to original and, then, sequentially changed again.

THIRD EMBODIMENT

An extra data adding unit in accordance with a third embodiment is generally comprised of a data display section, a fixed pattern, a light sensing means, a monitor display section, switches, and a control section. The functions assigned to the data display section, monitor display section, light sensing means, switches and the control section are similar to those which have been shown and described in relation to the first and second embodiments and modifications thereto. The fixed pattern is provided for distinguishing extra data being displayed on the data display section from document data. The data display section and fixed pattern are disposed on one surface of the unit while the monitor display section and switches are disposed on the other surface. That surface of the unit on which the data display section and fixed pattern are provided are constituted by a white, light diffusing surface except for those display section and fixed pattern. The light sensing means is located adjacent to the surface with the light diffusing surface so as to sense light which is adapted to illuminate an original document. The fixed pattern serves the function of the light sensing means as well or, alternatively, at least a part of the fixed pattern constitutes a light inlet portion for the light sensing means. That surface of the unit on which the data display is disposed is white except for that display section and the fixed pattern, so that it merges into the background when superposed on a relatively thin document. Extra data is copied together with the fixed pattern and, therefore, readily discriminated from document data. Further, since the light sensing means senses the light for illumination, it is possible to detect information which is associated with the copier.

A specific construction of the extra data adding unit in accordance with the third embodiment will be described. In the third embodiment, the same or similar structural elements as those of the second embodiment and modifications thereto are designated by reference numerals, and detailed description thereof will be omitted.

Figure 14A:
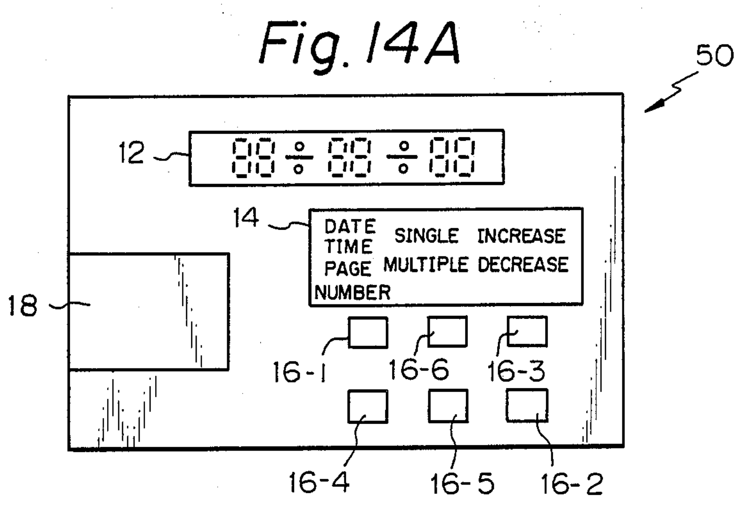
FIGS. 14A to 14C are views showing a third embodiment of the present invention.
Figure 14B:
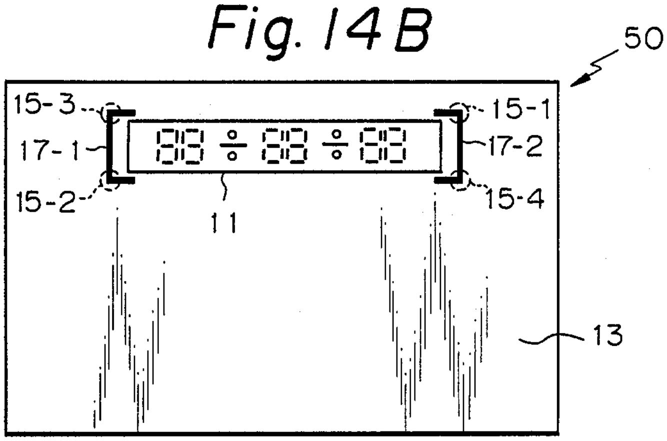
Figure 14C:
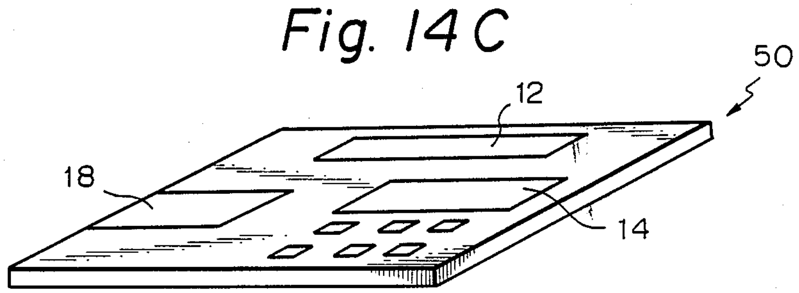

Referring to FIGS. 14A to 14C, an extra data adding unit 50 in accordance with the third embodiment is shown. As shown in FIG. 14B, a fixed pattern 17-1 and 17-2 are in a form of brackets which hold the display 11 therebetween in the lengthwise direction of the latter. The pattern 17-1 and 17-2 overlap the light-sensitive elements 15-1 to 15-4. The relationship between the fixed pattern 17-1 and 17-2 and the light-sensitive elements 15-1 to 15-4 will be described with reference to FIG. 15.

Figure 15:
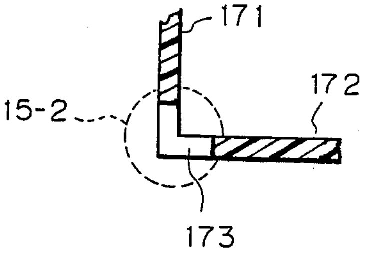
FIG. 15 is a fragmentary enlarged view representative of a relationship between a fixed pattern and a light-sensitive element in accordance with the third embodiment.

In FIG. 15 which shows a part of the fixed pattern 17-1 and light sensitive element 15-2 by way of example, the reference numerals 171, 172 and 173 designate in combination a bottom portion of the part of the pattern 17-1 as shown in FIG. 14B. While the pattern fragments 171 and 172 are formed by printing, the pattern fragment 173 which is located at the corner as indicated by hatching is constituted by a window for allowing light to become incident to the light-sensitive element 15-2. The other corner of the pattern part 17-1 and the corners of the counterpart 17-2 are each constituted by a window also. In such a configuration, when the unit 50 is laid on the glass platen to be copied together with an original document, each of the light-sensitive elements 15-1 to 15-4 is capable of sensing the light adapted for illumination through the window of its associated fixed pattern part 17-1 or 17-2. Again, since the intensity of light for illumination as measured on the glass platen is far greater than those of natural light and ordinary room lighting, the light for illumination can be sensed in distinction from the others by adequately selecting the sensing level.

It follows that, by controlling the display of the unit 50 based on the outputs of the light-sensing elements 15-1 to 15-4, advanced functions are achievable while preserving the advantage that the unit 50 is independent of a copier and can be placed in any desired position on a glass platen. While the display 11 is turned off, the back of the unit 50 except for the fixed patterns remains white over its entire area and, therefore, it does not show itself on a copy even when copied together with a document, offering the previously stated advantage in relation to a relatively thin and transparent document.

Figure 16A:
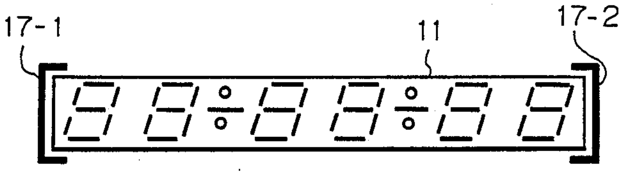
FIGS. 16A to 16D are views each showing a specific configuration of the fixed pattern.
Figure 16B:
Figure 16C:
Figure 16D:
Figure 17:
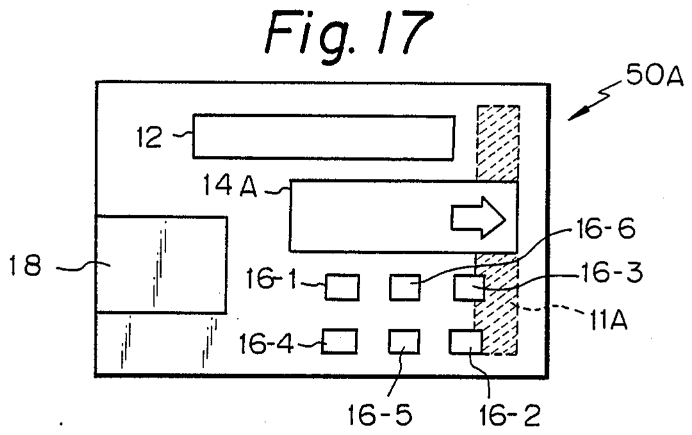
FIGS. 17 to 20 are views showing modifications to the third embodiment.
Figure 18:
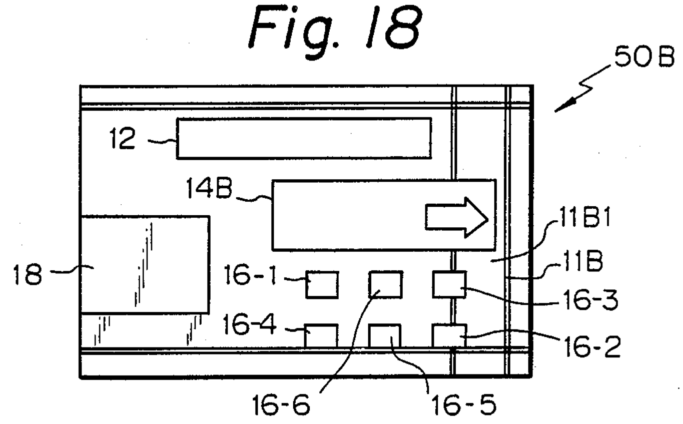
Figure 19:
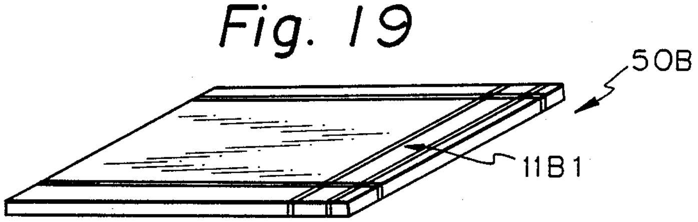
Figure 20:
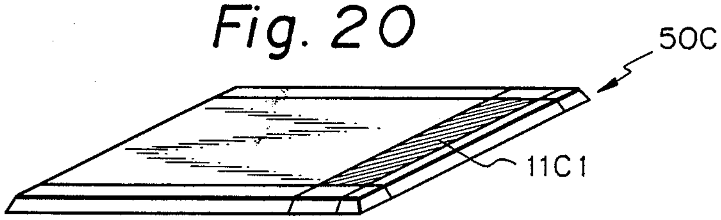

FIGS. 16A to 15D each shows a different example of the fixed pattern 17-1 and 17-2. The fixed pattern shown in FIG. 16A is identical with that of FIG. 14B. The fixed pattern of FIG. 16B is arcuate, that of FIG. 16C is rectangular (surrounding the display 11), and that of FIG. 16D is made up of two parallel lines which hold the display 11 therebetween. The fixed pattern should preferably be symmetrical with respect to the center of display because data being displayed on the display 11 is invertible in its up-down orientation.

In the above embodiment, the light sensing means and the fixed pattern are physically independent of each other, and the fixed pattern is at least partly configured to serve as a light inlet for the light sensing means. Alternatively, the fixed pattern itself may be implemented with a solar cell or like photodetector so as to bifunction as the light sensing means. For example, when the fixed pattern shown in FIG. 16C serves as the light sensing means, the duration of the previously stated signal A is the duration for which the fixed pattern, or light sensing means, senses light.

FIGS. 17 to 20 show modifications to the third embodiment of the present invention. In these modifications, data adding units 50A, 50B and 50C correspond, respectively, to those of FIGS. 10 to 13 and, therefore, details thereof will not be described to avoid redundancy.

Further, a procedure for adding extra data by using any of the third embodiment and its modifications is identical with the procedure which has been described in relation to the second embodiment and its modifications.

In summary, it will be seen that an extra data adding unit in accordance with the present invention achieves various advantages as enumerated below.

(1) Since a battery for powering the unit is contained in the unit, the unit is fully independent of a copier body and, therefore, allows extra data to be added in any position on the glass platen of a copier.

(2) That surface of the unit on which a data display is provided is entirely white except for the data display and a fixed pattern, it does not appear on a copy and, therefore, insures quality reproduction.

(3) The position of the data display is visible even on the other surface of the unit, facilitating positioning of the unit.

(4) Since the orientation of the unit on the glass platen is open to choice, it may be even be so positioned as to add extra data obliquely for discriminating the extra data from document data.

(5) In the case of a copier of the type having trimming and masking capabilities and a capability of copying two different documents one after another in a single paper, there may be effected a step of copying desired extra data in a trim mode and a step of changing the trim mode to a mask mode to copy a document. This practically eliminates restrictions otherwise imposed with regard to the position for adding extra data, i.e., the fear of shadow due to the overlap of the unit and a document and other occurrences is precluded. For example, a page number printed on a document may be deleted and replaced with a new page number. When it is desired to add extra data to a blank portion of a document, it is needless to change the trim mode to the mask mode, i.e., all that is required is selecting the trim mode only when the unit is to be copied and, as for a document, copying its entire area. In such a case, since the unit is entirely white, the trimming area to be specified simply has to cover the display and be smaller than the contour of the unit and, therefore, it does not have to be accurately specified. In this manner, various advanced functions unattainable with the prior art extra data adding devices are realized.

(6) Since the light adapted to illuminate a document is sensed by a light sensing means, extra data such as page and number can be automatically changed to enhance operability.

(7) Since a fixed pattern is copied together with extra data, the latter can be distringuished from document data at a glance.

Various modifications will become possible for those skilled in the art after receiving the teachings of the present disclosure without departing from the scope thereof.

What is claimed is:

1. A thin flat unit usable with a copier for copying desired extra data together with data which are printed on an original document, comprising:

a base plate having a thin flat configuration;

a first display section provided on one surface of said base plate for displaying the extra data;

a second display section provided on the other surface of said base plate for monitoring the extra data;

switches arranged on said other surface of said base plate for setting modes and data; and a control section responsive to outputs of said switches for controlling said first and second display sections.

2. A unit as claimed in claim 1, further comprising a battery removably installed in said base plate.

3. A unit as claimed in claim 1, wherein said one surface comprises a white, light diffusing surface except for said first display section.

4. A unit as claimed in claim 1, wherein said second display section comprises a first display located in correspondence to said first display section, and a second display for displaying guidances.

5. A unit as claimed in claim 1, wherein said first display section has a rectangular shape.

6. A unit as claimed in claim 1, further comprising a light sensing means for sensing light which illuminates the document.

7. A unit as claimed in claim 6, wherein said one surface comprises a white, light diffusing surface except for said first display section, said light sensing means being located adjacent to at least a pair of portions of said first display section which are positioned diagonally to each other.

8. A unit as claimed in claim 7, further comprising a fixed pattern provided on said one surface for distinguishing the extra data displayed by said first display section from the document data.

9. A unit as claimed in claim 8, wherein said fixed pattern bifunctions as said light sensing means.

10. A unit as claimed in claim 8, wherein at least a part of said fixed pattern constitutes a light inlet for said light sensing means.

* * * * *